United States Patent
Hsieh et al.

(10) Patent No.: US 9,790,361 B2
(45) Date of Patent: Oct. 17, 2017

(54) LOW-DIELECTRIC PHOSPHORUS-CONTAINING POLYESTER COMPOSITE AND METHOD OF MANUFACTURING THE SAME

(71) Applicant: Jiangsu Yoke Technology Co., Ltd, Jiangsu Province (CN)

(72) Inventors: Tung-Ying Hsieh, Jiangsu Province (CN); Qi Shen, Jiangsu Province (CN); Jung-Che Lu, Jiangsu Province (CN); Ti-Kai Yu, Jiangsu Province (CN)

(73) Assignee: Jiangsu Yoke Technology Co., Ltd, Jiangsu Province (CN)

( * ) Notice: Subject to any disclaimer, the term of this patent is extended or adjusted under 35 U.S.C. 154(b) by 0 days.

(21) Appl. No.: 14/932,938

(22) Filed: Nov. 4, 2015

(65) Prior Publication Data

US 2016/0130392 A1    May 12, 2016

(30) Foreign Application Priority Data

Nov. 11, 2014 (CN) .......................... 2014 1 0631613

(51) Int. Cl.

| | | |
|---|---|---|
| C08G 63/00 | (2006.01) | |
| C08G 65/38 | (2006.01) | |
| C08L 67/02 | (2006.01) | |
| C08L 63/00 | (2006.01) | |
| C08G 63/692 | (2006.01) | |
| C09D 163/00 | (2006.01) | |
| C08G 59/32 | (2006.01) | |
| C08G 59/62 | (2006.01) | |

(52) U.S. Cl.
CPC .......... *C08L 67/02* (2013.01); *C08G 59/3272* (2013.01); *C08G 59/621* (2013.01); *C08G 63/692* (2013.01); *C08L 63/00* (2013.01); *C09D 163/00* (2013.01)

(58) Field of Classification Search
CPC ..... C08L 67/02; C08L 63/00; C08G 59/3272; C08G 59/621; C08G 63/692; C09D 163/00
USPC .......................... 525/438; 528/167, 176, 219
See application file for complete search history.

(56) References Cited

U.S. PATENT DOCUMENTS 5,399,654 A * 3/1995 Ko .......................... C08G 63/79
528/104

FOREIGN PATENT DOCUMENTS

| CN | 103122010 A | 5/2013 | |
|---|---|---|---|
| CN | 103304998 A | 9/2013 | |
| CN | 103382242 A | 11/2013 | |
| CN | 103554441 A | 2/2014 | |
| DE | 4308184 A1 | 9/1994 | |
| DE | 4308185 A1 | 9/1994 | |
| DE | 4308187 A1 | 9/1994 | |
| EP | 0384939 A1 | 9/1990 | |
| EP | 0384940 A1 | 9/1990 | |
| EP | 0408990 A2 | 1/1991 | |
| GB | 984522 A * | 2/1965 | ............ C08G 63/19 |
| JP | 2003-105058 A | 4/2003 | |
| JP | 2008-19311 A | 1/2008 | |
| JP | 2012251133 A | 12/2012 | |
| JP | 5814431 B2 | 11/2015 | |
| TW | 201348288 A | 12/2013 | |
| WO | 967685 A1 | 3/1996 | |
| WO | 967686 A1 | 3/1996 | |
| WO | 2013145950 A1 | 10/2013 | |

OTHER PUBLICATIONS

Serbezeanu et al., "Comparative Study of Phosphorus-Containing Polymers with High Performance Properties", Revue Roumaine de Chimie, 2012, vol. 57, No. 4-5, p. 393-399.*

* cited by examiner

*Primary Examiner* — David Karst
(74) *Attorney, Agent, or Firm* — CKC & Partners Co., Ltd.

(57) ABSTRACT

A phosphorus-containing polyester composite and method of manufacturing the same is related to the field of compound formulation. The composite is prepared by condensation under certain conditions of (A) a poly-functional phosphorus-containing aromatic hydroxy compound; (B) a difunctional aromatic acryl chloride compound and (C) a monofunctional aromatic phenol compound used as a blocking agent. The composite is used as a curing agent for epoxy. The phosphorus-containing polyester composite is reacted with the epoxy group of the epoxy to obtain non-halogen and flame-retardant cured composite being environment friendly and having low dielectric, low dielectric loss factor and high heat resistance. It can be used in an integrated circuit board and used as a semiconductor packaging material.

7 Claims, No Drawings

LOW-DIELECTRIC PHOSPHORUS-CONTAINING POLYESTER COMPOSITE AND METHOD OF MANUFACTURING THE SAME

RELATED APPLICATIONS

This application claims priority to China Application Serial Number 201410631613.5, filed Nov. 11, 2014 which is herein incorporated by reference.

BACKGROUND

Field of Invention

The present invention relates to a phosphorus-containing polyester composite and method of manufacturing the same, which is related to the field of compound formulation. The phosphorus-containing polyester composite is prepared by condensation under certain conditions of (A) a poly-functional phosphorus-containing aromatic hydroxy compound; (B) a difunctional aromatic acryl chloride compound and (C) a monofunctional aromatic phenol compound used as a blocking agent. The composite is used as a curing agent for epoxy. The phosphorus-containing polyester composite is reacted with the epoxy group of the epoxy to obtain non-halogen and flame-retardant cured composite being environment friendly and having low dielectric, low dielectric loss factor and high heat resistance. Additionally, the cured composite has a high crosslinking density, such that even when the ester bond at the crosslinking point is hydrolyzed lower-molecular-weight carboxylic acid is not free, and the cured composite also shows a low dielectric loss factor under high moisture. Therefore the composite can be used in an integrated circuit board and used as a semiconductor packaging material.

Description of Related Art

As defined by the chemical structure of itself, the epoxy resin has great performances in terms of reactivity, toughness, flexibility and the like, and also has good mechanical and electrical performances as well as dimensional stability; the adhesion of the epoxy resin to different substrates is also great. The cured epoxy resin can not only keep the original properties of the substrates, but also have improved barrier properties to water, gas and chemicals, as well as having advantages of light weight and low cost. Therefore the epoxy can be widely applied in electronics and aerospace industries, especially in the fields of semiconductor packaging materials and substrates of printed circuit boards. In addition, with the rapid changes in science and technology, many computer information industries, communication industries and consumer electronics also develop vary quickly. Throughout the whole electronics industry, the development features are as follows:
  1. the using frequency becomes higher; and
  2. the manufacturing technical level becomes higher.

For example, the printed circuit board are developed in the tendency of low-dielectric, low thermal expansion, multilayer, high thermal resistance and the like. Meanwhile, for satisfying the requirement of being friendly to the environment, the electronics and communication products are also developed in the tendency of being lightweight, thin, short and small, having high reliability, multiple functions and being environment friendly. With high frequency of the use of wireless networks and communication devices, the demand of the high-frequency substrate will become the future development trend. Briefly, the requirements for materials used in the high-frequency substrate are no more than being capable of transferring data quickly, without causing data loss or data interference during the transfer process. Therefore the material selected for manufacturing the high-frequency communication device should have the following basic characteristics:
  (1) low and stable dielectric constant;
  (2) small dielectric consumption factor;
  (3) low water absorption;
  (4) excellent chemical resistance; and
  (5) great heat resistance.

Therefore, it is an important issue currently to be overcome by researchers of the field to develop a high-frequency substrate material having low dielectric constant, small dielectric consumption factor and the like electrical characteristics in addition to flame retardancy and heat resistance.

SUMMARY

The present invention provides a low-dielectric phosphorus-containing polyester composite mainly characterized of low dielectric constant and great heat resistance, as well as flame retardancy. When the low-dielectric phosphorus-containing polyester composite reacts with the epoxy, the composite can react with a high-polarity hydroxyl group produced by curing of epoxy to form a lipid structure, so as to effectively reduce the dielectric constant. Therefore the composite can be applied in the field of high-frequency communication devices.

The electrical characteristics of the substrate material used in the printed circuit board may be determined by the species of three main composing materials of the substrate, i.e., (i) resin, (ii) filling material, and (iii) reinforcing material. In terms of a resin system, a FR-4 (Tg140° C.) substrate specification composed of current widely-used epoxy resin (e.g., South Asia NPEB454A80) and glass fiber (E glass) has a dielectric constant (Dk) value of only 4.6, which cannot satisfy the requirement of high-frequency transferring field although different resin systems (such as bismaleimide triazine resin (BT), cyanate ester resin and polytetrafluoroethylene (PTFE)) are developed successively. However, the manufacturing and machining conditions of the newly developed resin system has great differences from the existing conditions for substrate machining processes, most of which cannot use the existing machines, and thus the newly developed resin system cannot be widely applied.

However the issue of insufficient flame retardancy occurs when the epoxy resin is applied in the printed circuit board, and the traditional solution is adding a halogen flame retardant into the epoxy resin to reach the requirement of flame retardant. However, when burned, the halogen flame retardant generates dioxin, benzofuran and irritating and corrosive harmful gases, and small-molecule flame retardant often causes reduction of mechanical properties and photo-decomposition, thereby causing degradation of materials. Meanwhile, issues of migration and volatilization occur, thereby causing reduction of material properties and an undesirable flame retardant effect. Therefore, approaches which use an organic phosphorus flame retardant to replace the halogen flame retardant in a thermosetting epoxy composite are successively published, for example, as described in patents EP A 0384939, EP A 0384940, EPA 0408990, DE A 4308184, DE A 4308185, DE A 4308187, WO A 96/07685 and WO A 96/07686. Furthermore, in terms of a laminate of the printed circuit, with the increasing of environmental awareness, currently the international norms requires Lead free manufacturing processes, such requirements for machining properties of the substrate are strict, especially for characteristics such as the glass-transition temperature (Tg) of the material and the heat resistance of the substrate in a solder machine, which is an important issue to be overcome by researchers of the field.

The present invention just provides a low-dielectric phosphorus-containing polyester composite which can be applied in curing of epoxy and confers the cured epoxy with a great flame retardant effect. By introducing an active ester group, the dielectric constant can be reduced effectively. By introducing an environment-friendly organic phosphorus group into the chemical structure, the requirement of high-effective flame retardant is achieved in addition to maintaining the original excellent characteristics of the epoxy resin. In summary, the ester-modified Phosphorus phenolic resin provided by the present invention can play the role of curing agent of epoxy, and after it reacts with the epoxy, the resulting cured epoxy composite has low dielectric constant, high flame retardancy, high Tg of materials, high heat resistance and the like properties, such that the curing system can be successfully applied in the field of high-frequency electronic materials.

The novel low-dielectric phosphorus-containing polyester composite is prepared by condensation under certain conditions of (A) a poly-functional phosphorus-containing aromatic hydroxy compound; (B) a difunctional aromatic acryl chloride compound; and (C) a monofunctional aromatic phenol compound used as a blocking agent.

The poly-functional phosphorus-containing aromatic hydroxy compound used in the preparation method of the present invention is composed of one or more compounds selected from the following compounds (A-1)-(A-4):

Compound (A-1)

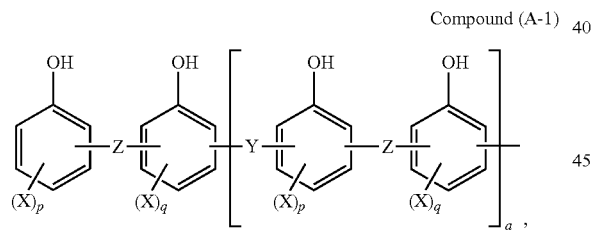

wherein $X =$ 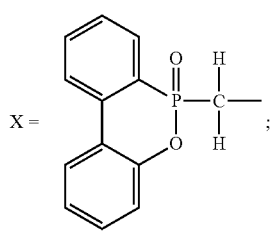 [SMILES: CCP1(=O)Oc2ccccc2-c2ccccc21]

$Y = -CH_2-$ or $-CH_2-O-CH_2-$, wherein Y of different structural unit may be the same or different;

Z=an unsubstituted group,

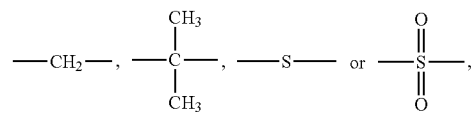

wherein Z of different compounds may be the same or different;

p=0-2; q=0-2; p+q is an integer greater than or equal to 1; and a is an integer greater than or equal to 0;

Compound (A-2)

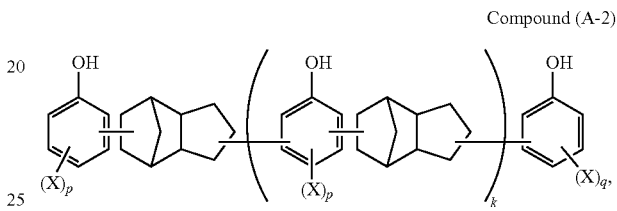

wherein X, p and q are defined as above; and k is an integer greater than or equal to 0;

Compound (A-3)

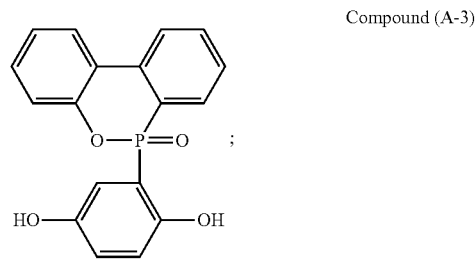

Compound (A-4)

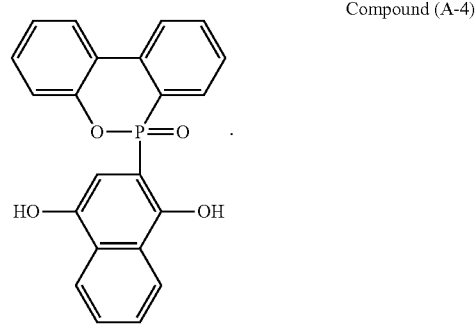

The aforementioned poly-functional phosphorus-containing aromatic hydroxy compound (A-1) may be:

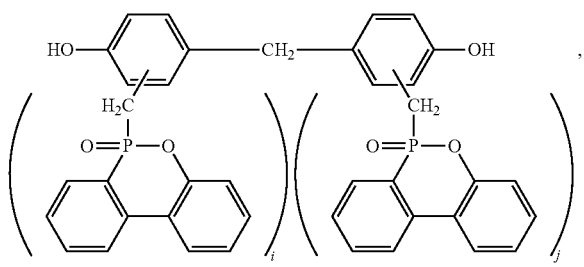

wherein i=0-2; j=0-2; and i+j is an integer greater than or equal to 1.

The aforementioned poly-functional phosphorus-containing aromatic hydroxy compound (A-1) may be:

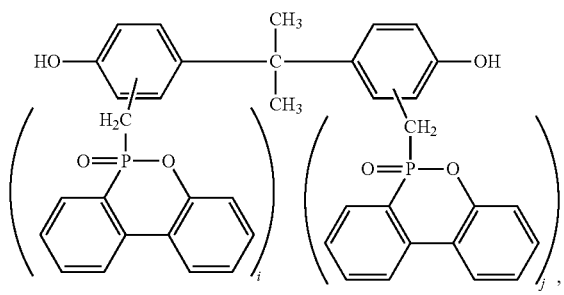

wherein i=0-2; j=0-2; and i+j is an integer greater than or equal to 1.

The aforementioned poly-functional phosphorus-containing aromatic hydroxy compound (A-1) may be:

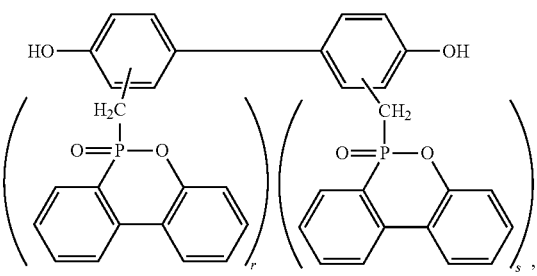

wherein, r=0-2; s=0-2; and r+s is an integer greater than or equal to 1.

The aforementioned poly-functional phosphorus-containing aromatic hydroxy compound (A-1) may be:

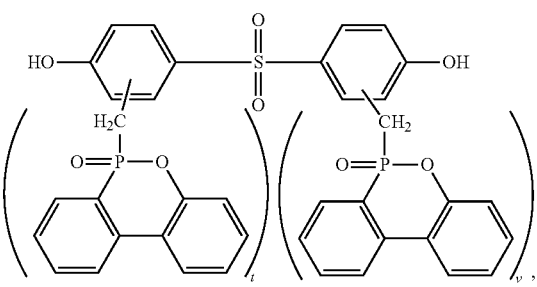

wherein, t=0-2; v=0-2; and t+v is an integer greater than or equal to 1.

The difunctional aromatic acryl chloride compound used in the preparation method of the present invention is preferably one or more compounds selected from isophthaloyl dichloride and paraphthaloyl chloride.

The monofunctional aromatic phenol compound used as a blocking agent in the preparation method of the present invention is preferably one of phenol, o-cresol, sol, p-cresol, o-phenylphenol, m-phenylphenol, p-phenylphenol, 2,6-dimethylphenol, 2,4-dimethylphenol, α-naphthol and β-naphthol, or a combination thereof.

The invention also provides a method for preparing a cured phosphorus-containing flame-retardant epoxy composite, wherein the aforementioned novel low-dielectric phosphorus-containing polyester composite is reacted with the epoxy independently or in combination of a conventional epoxy curing agent under a high temperature to obtain the cured phosphorus-containing flame-retardant epoxy composite. The glass fiber is impregnated with the non-halogen flame-retardant epoxy composite, and then cured under heating to form a flame-retardant copper covered laminate, which can be used in an integrated circuit board or used as a semiconductor packaging material. That is, the resulting cured flame-retardant epoxy composite can be used as the base resin of printed circuit board and as the semiconductor packaging material.

The conventional epoxy curing agent used in the present invention may be one of phenol-formaldehyde novolac, o-cresol-formaldehyde novolac, bisphenol A-formaldehyde novolac, dicyandiamide, methylenedianiline and diaminodiphenylsulfone, or a combination thereof.

The epoxy used in the present invention may be one of bisphenol A epoxy, bisphenol F epoxy, bisphenol S epoxy, dihydroxy diphenyl epoxy, phenol novolac epoxy, o-cresol novolac epoxy, bisphenol A novolac epoxy, α-naphthol novolac epoxy, β-naphthol novolac epoxy, epoxy containing a copolymer of dicyclopentadiene and phenol, or a combination thereof. Specially, when used; the aforementioned epoxy containing the copolymer of dicyclopentadiene and phenol has excellent moisture resistance in addition to great heat resistance and low dielectric loss factor, so that the epoxy has great weld crack resistance when applied in the field of semiconductor packaging material and printed circuit board.

In order to effectively accelerate the reaction, in the epoxy composition of the present invention, in addition to the aforementioned epoxy and low-dielectric phosphorus-containing polyester composite, a curing accelerator can be used in combination. Based on the total weight of epoxy and curing agent, the weight of the curing accelerator is in the range of 0.01-2.5%. An appropriate curing accelerator may be one of 2-methylimidazole, 2-phenylimidazole, 2-ethyl-4-methylimidazole, 1-benzyl-2-methylimidazole, 2-heptadecyl-1H-imidazole, 2-undecyl-1H-imidazole, triphenylphosphine, tributyl phosphine, trimethyl phosphate, triethyl phosphate, or a combination thereof.

In the epoxy and the low-dielectric phosphorus-containing polyester composite in the epoxy composition, the amount of an ester group of the phosphorus-containing polyester composite relative to 1 mol epoxy group of the epoxy is preferably 0.15-5 mol, and more preferably 0.5-2.5 mol. If the amount of the phosphorus-containing polyester composite is beyond the range, then the reaction between the phosphorus-containing polyester composite and the epoxy is not sufficient, and thus the effect on the dielectric loss factor and Tg is not sufficient.

In the epoxy combination, an inorganic filling material may also be used depending on the application. The inorganic filling material may be fused silica, crystalline silica, aluminium oxide, aluminium hydroxide, magnesium hydroxide, and the like. When the amount of the aforementioned inorganic filling material is large, the inorganic filling material is preferably fused silica. The aforementioned fused silica may be ragged or spherical for use and is preferably spherical in order to increase the amount of the fused silica and inhibit the rising of melting viscosity of the material. Moreover, in order to increase the amount of the spherical silica, the particle size distribution of the spherical silica is preferably adjusted appropriately.

The cured phosphorus-containing flame-retardant epoxy composite of the instant disclosure is prepared by a curing reaction under a temperature above 150° C. of epoxy and a curing agent with the same equivalent weight.

In order to reach the V-0 flame-retardant level of UL94, in the cured phosphorus-containing flame-retardant epoxy composite (epoxy+phosphorus-containing polyester composite+other additives) of the instant disclosure, although the formulation and particular structures of various components have variations, the phosphorus content of the final cured product should be maintained in the range of 0.5-10 wt %.

DETAILED DESCRIPTION

In order to make the description of the present invention more detailed and more comprehensive, various aspects and embodiments of the present invention are described below illustratively. However, these illustrated aspects and embodiments are not the only way for implementing or using the embodiments of the present invention. The embodiments disclosed hereinafter may be combined with or replaced by each other under beneficial situations, and alternatively other embodiments may be appended to an embodiment, without any further statement or illustration. In the following description, many specific details are illustrated so that readers can understand the following embodiments completely. However, the embodiments of the present invention may also be implemented without these specific details.

The present invention can be understood by referring to the following embodiments, and the following embodiments are only used for illustration, without limiting the range of the present invention.

1. Preparation Method of a Phosphorus-Containing Polyester Composite

Synthesis Example 1

520 g bisphenol A, 324 g formaldehyde aqueous solution (with a mass concentration of 37%) and 24 g sodium hydroxide are added into a reaction kettle, and then stirring starts and the temperature is raised to 40° C. for 3 hours. Thereafter the temperature is increased to 65° C. for 3 hours, and then 1480 g n-butanol is added and refluxed for 12 hours. Then the material temperature is decreased to 55-60° C., and reduced pressure distillation is performed to remove about 1000 g n-butanol, so as to obtain an intermediate.

1080 g DOPO (9,10-dihydro-9-oxa-10-phosphaphenanthrene-10-oxide) is added into the intermediate, and the material temperature is increased gradually from 80° C. to 180° C. in 2 hours, and a reduced pressure is applied to the system at 120° C. to ensure that the n-butanol is discharged from the system in time. The material temperature is kept at 180° C. for 1 hours and then is decreased to 130° C., and the final product is pulled out to obtain a phosphorus phenolic resin P-1.

Synthesis Example 2

490 g bisphenol F, 324 g formaldehyde aqueous solution (with a mass concentration of 37%) and 24 g sodium hydroxide are added into a reaction kettle, and then stirring starts and the temperature is raised to 40° C. for 3 hours. Thereafter the temperature is increased to 65° C. for 3 hours, and then 1480 g n-butanol is added and refluxed for 12 hours. Then the material temperature is decreased to 55-60° C., and reduced pressure distillation is performed to remove about 1000 g n-butanol, so as to obtain an intermediate.

1080 g DOPO (9,10-dihydro-9-oxa-10-phosphaphenanthrene-10-oxide) is added into the intermediate, and the material temperature is increased gradually from 80° C. to 180° C. in 2 hours, and a reduced pressure is applied to the system at 120° C. to ensure that the n-butanol is discharged from the system in time. The material temperature is kept at 180° C. for 1 h and then is decreased to 130° C., and the final product is pulled out to obtain a phosphorus phenolic resin P-2.

Synthesis Example 3

372 g dihydroxy diphenyl, 324 g formaldehyde aqueous solution (with a mass concentration of 37%) and 24 g sodium hydroxide are added into a reaction kettle, and then stirring starts and the temperature is raised to 40° C. for 3 hours. Thereafter the temperature is increased to 65° C. for 3 hours, and then 1480 g n-butanol is added and refluxed for 12 hours. Then the material temperature is decreased to 55-60° C., and reduced pressure distillation is performed to remove about 1000 g n-butanol, so as to obtain an intermediate.

1080 g DOPO (9,10-dihydro-9-oxa-10-phosphaphenanthrene-10-oxide) is added into the intermediate, and the material temperature is increased gradually from 80° C. to 180° C. in 2 hours, and a reduced pressure is applied to the system at 120° C. to ensure that the n-butanol is discharged from the system in time. The material temperature is kept at 180° C. for 1 hours and then is decreased to 130° C., and the final product is pulled out to obtain a phosphorus phenolic resin P-3.

Synthesis Example 4

542 g bisphenol F, 324 g formaldehyde aqueous solution (with a mass concentration of 37%) and 24 g sodium hydroxide are added into a reaction kettle, then stirring is started and the temperature is heated to 40° C. for 3 hours. Thereafter the temperature is increased to 65° C. for 3 hours, and then 1480 g n-butanol is added and refluxed for 12 hours. Then the material temperature is decreased to 55-60° C., and reduced pressure distillation is performed to remove about 1000 g n-butanol, so as to obtain an intermediate.

1080 g DOPO (9,10-dihydro-9-oxa-10-phosphaphenanthrene-10-oxide) is added into the intermediate, and the material temperature is increased gradually from 80° C. to 180° C. in 2 hours, and a reduced pressure is applied to the system at 120° C. to ensure that the n-butanol is discharged from the system in time. The material temperature is kept at 180° C. for 1 h and then is decreased to 130° C., and the final product is pulled out to obtain a phosphorus phenolic resin P-4.

Synthesis Example 5

372 g dicyclopentadiene phenol resin (Taiwan K.L. CHEMICALS K-DPP-85; softening point of 85° C.), 324 g formaldehyde aqueous solution (with a mass concentration of 37%) and 24 g sodium hydroxide are added into a reaction kettle, and then stirring starts, and the temperature is raised to 40° C. for 3 hours. Thereafter the temperature is increased to 65° C. for 3 hours, and then 1480 g n-butanol is added and refluxed for 12 hours. Then the material temperature is decreased to 55-60° C., and reduced pressure distillation is performed to remove about 1000 g n-butanol, so as to obtain an intermediate.

1080 g DOPO (9,10-dihydro-9-oxa-10-phosphaphenanthrene-10-oxide) is added into the intermediate, and the material temperature is increased gradually from 80° C. to 180° C. in 2 hours, and a reduced pressure is applied to the system at 120° C. to ensure that the n-butanol is discharged from the system in time. The material temperature is kept at 180° C. for 1 hour and then is decreased to 130° C., and the final product is pulled out to obtain a phosphorus phenolic resin P-5.

Synthesis Example 6-13

The phosphorus phenolic resin and monofunctional aromatic phenol compound are dissolved in toluene, and then the solution of difunctional aromatic acryl chloride compound pre-dissolved in toluene is added, and then the temperature is increased to 80° C. under stirring. Thereafter a potassium hydroxide aqueous solution is added dropwise and reacted under 60° C. for 3 hours. After the reaction is completed, the solution stands for liquid separation, the lower brine layer is discharged and the upper layer is washed with water for three times and then the water layer is discharged to obtain a resin solution. The resin solution is dried at 80° C., and the dried resin is dissolved in the toluene to obtain a final resin solution. The detailed ratios of raw materials are as shown in table 1.

Synthesis Example 14-15

The dicyclopentadiene phenol resin (Taiwan K.L. CHEMICALS K-DPP-85; softening point at 85° C.) (8 eq) and monofunctional aromatic phenol compound are dissolved in toluene, and then the solution of difunctional aromatic acryl chloride compound pre-dissolved in toluene is added and then the temperature is increased to 80° C. under stirring. Thereafter a potassium hydroxide aqueous solution is added dropwise and reacted under 60° C. for 3 hours. After the reaction is completed, the solution stands for liquid separation, the lower brine layer is discharged and the upper layer is washed with water for three times and then the water layer is discharged to obtain a resin solution. The resin solution is dried at 80° C., and the dried resin is dissolved in the toluene to obtain a final resin solution. The detailed ratios of raw materials are as shown in table 1.

TABLE 1

| | | Item Number | | | | |
|---|---|---|---|---|---|---|
| | | Synthesis Example 6 | Synthesis Example 7 | Synthesis Example 8 | Synthesis Example 9 | Synthesis Example 10 |
| Product Name | | B-1 | B-2 | B-3 | B-4 | B-5 |
| difunctional acryl chloride compound | isophthaloyl dichloride | 200 | 100 | 200 | 100 | 200 |
| | paraphthaloyl chloride | | 100 | | 100 | |
| Phenolic compound | -naphthol | 25 | 25 | | 25 | 25 |
| | o-phenylphenol | | | 35 | | |
| Phenolic resin | phosphorus phenolic resin P-1 | 420 | | | | |
| | phosphorus phenolic resin P-2 | | 400 | | | |
| | phosphorus phenolic resin P-3 | | | 350 | | |
| | phosphorus phenolic resin P-4 | | | | 430 | |
| | phosphorus phenolic resin P-5 | | | | | 380 |

| | | Item Number | | | | |
|---|---|---|---|---|---|---|
| | | Synthesis Example 11 | Synthesis Example 12 | Synthesis Example 13 | Synthesis Example 14 | Synthesis Example 15 |
| Product Name | | B-6 | B-7 | B-8 | C-1 | C-2 |
| difunctional acryl chloride compound | isophthaloyl dichloride | 100 | 200 | 100 | 200 | 200 |
| | paraphthaloyl chloride | 100 | | 100 | | |
| phenolic compound | -naphthol | | 25 | 25 | 25 | |
| | o-phenylphenol | 35 | | | | |
| | phenol | | | | | 20 |

TABLE 1-continued

| | | | | | |
|---|---|---|---|---|---|
| phenolic resin | phosphorus phenolic resin P-5 | 380 | | | |
| | Compound (A-3) | | 300 | | |
| | Compound (A-4) | | | 320 | |
| | dicyclopentadiene phenol resin K-DPP-85 | | | | 300 |
| | dicyclopentadiene phenol resin K-DPP-85 | | | | 300 |

2. Testing Results of Phosphorus-Containing Polyester Composite Applied in Copper Covered Laminate Embodiments 1-8

Phosphorus-containing polyester composites (from B-1 to B-8), a conventional curing agent, bisphenol A novolac epoxy resin (BNE), o-cresol formaldehyde novolac epoxy resin (CNE) and phenol novolac epoxy (PNE) are mixed uniformly according to the weight ratios shown in table 2, with aluminium hydroxide, silica and imidazole-type curing accelerator in appropriate amount of solvent, then a glass fiber cloth is impregnated with the mixture by using a small-scale impregnation machine, the impregnated glass fiber cloth is heated at 170° C. for 150 seconds, and then cut and cured in a small-scale thermocompressor at 25 kg/cm² under a temperature of 185° C. for 2 hours to obtain the non-halogen copper covered laminate.

Comparative Embodiments 1-2

Polyester composites (from C-1 to C-2), bisphenol A novolac epoxy resin (BNE), o-cresol formaldehyde novolac epoxy resin (CNE) and phenol novolac epoxy (PNE) are mixed uniformly according to the weight ratios shown in table 2, with aluminium hydroxide, silica, imidazole-type curing accelerator and a phosphate flame retardant PX-200 (Japan bus company) in appropriate amount of solvent; then a glass fiber cloth is impregnated with the mixture by using a small-scale impregnation machine, the impregnated glass fiber cloth is heated at 170° C. for 150 seconds, and then cut and cured in a small-scale thermocompressor at 25 kg/cm² under a temperature of 185° C. for 2 hours to obtain the non-halogen copper covered laminate.

1. Gelling Time of Novolac (Sec):
0.3 ml novolac resin is placed on a heating plate of 170° C. to measure the gelling time thereof.
2. Glass-Transition Temperature (° C.)
The used temperature rising rate=20° C./min, as measured by a differential scanning calorimeter (DSC).
3. Flame Retardancy:
The test piece is cut into a rectangle of 0.5 in ×4.7 in, then fired for 10 seconds with a blue flame having a flame height of 2 cm, and then the flame is removed, wherein the test piece is fired twice to record the automatic quench time after the flame is removed.
4. Water Absorption (%):
The test piece is heated in a pressure cooker of 2 atm at 120° C. for 30 min.
5. Dielectric Loss (1 GHz):
The test piece is cut into a square of 5 cm×5 cm, plate thicknesses at three positions of the plate is measured, and then the test piece is clamped into a dielectric analyzer to measure the dielectric loss and then take the mean of the measured values.
6. Dielectric Constant (1 GHz):
The etched substrate is cut into a square test piece of 5 cm², baked for 2 hours in an oven at 105° C., taken out and then is tested by a plate thickness tester to obtain the plate thicknesses at three positions thereon. Then the test piece is clamped in a dielectric tester to test the data of three positions and then obtain a mean value.

The present invention has been described by referring to the aforementioned embodiments, and based thereon various variations can be made by researchers skilled in the art. The scope of the present invention includes various variations falling into the scope and spirit of the appended claims.

Table 2 shows the testing results of the copper covered laminate.

TABLE 2 resin formulation and physical properties thereof

| | Embodiment 1 | Embodiment 2 | Embodiment 3 | Embodiment 4 | Embodiment 5 | Embodiment 6 | Embodiment 7 | Embodiment 8 | Comparative Embodiment 1 | Comparative Embodiment 2 |
|---|---|---|---|---|---|---|---|---|---|---|
| Resin BNE | 35 | 35 | 35 | 20 | 20 | 20 | 30 | 30 | 25 | 20 |
| Resin PNE | 10 | 10 | 10 | 10 | 10 | 10 | 0 | 0 | 5 | 10 |
| Resin CNE | 55 | 55 | 55 | 70 | 70 | 70 | 70 | 70 | 70 | 70 |
| Phosphorus-Containing Polyester Composite B-1 | 48 | | | | | | | | | |
| Phosphorus-Containing Polyester Composite B-2 | | 46 | | | | | | | | |
| Phosphorus-Containing Polyester Composite B-3 | | | 42 | | | | | | | |

TABLE 2-continued resin formulation and physical properties thereof

| | Embodiment 1 | Embodiment 2 | Embodiment 3 | Embodiment 4 | Embodiment 5 | Embodiment 6 | Embodiment 7 | Embodiment 8 | Comparative Embodiment 1 | Comparative Embodiment 2 |
|---|---|---|---|---|---|---|---|---|---|---|
| Phosphorus-Containing Polyester Composite B-4 | | | | 50 | | | | | | |
| Phosphorus-Containing Polyester Composite B-5 | | | | | 40 | | | | | |
| Phosphorus-Containing Polyester Composite B-6 | | | | | | 42 | | | | |
| Phosphorus-Containing Polyester Composite B-7 | | | | | | | 40 | | | |
| Phosphorus-Containing Polyester Composite B-8 | | | | | | | | 40 | | |
| Phosphorus-Containing Polyester Composite C-1 | | | | | | | | | 40 | |
| Phosphorus-Containing Polyester Composite C-1 | | | | | | | | | | 40 |
| Flame Retardant (aluminium hydroxide) | 20 | 20 | 20 | 20 | 20 | 20 | 20 | 20 | | |
| Phosphate Flame Retardant PX-200 | | | | | | | | | 30 | 30 |
| Filling Material (silica) | 10 | 10 | 10 | 10 | 10 | 10 | 10 | 10 | 10 | 10 |
| Accelerator 2MI (PHR) | 0.4 | 0.4 | 0.4 | | | | | | 0.4 | 0.4 |
| Accelerator 2PI (PHR) | | | | 0.4 | 0.4 | 0.4 | 0.5 | 0.5 | | |
| Phosphorus Content (%) | 1.20 | 1.30 | 1.30 | 1.16 | 1.16 | 1.20 | 1.35 | 1.24 | 1.30 | 1.30 |
| Gelling Time (sec) | 350 | 345 | 335 | 350 | 344 | 332 | 330 | 375 | 363 | 370 |
| Glass-Transition Temperature (° C.) | 172 | 170 | 174 | 180 | 170 | 178 | 176 | 174 | 160 | 150 |
| Flame Retardancy | 94V-0 | 94V-0 | 94V-0 | 94V-0 | 94V-0 | 94V-0 | 94V-0 | 94V-0 | 94V-1 | 94V-1 |
| Coefficient of Thermal Expansion ($\alpha 1/\alpha 2$) | 40/238 | 48/243 | 42/235 | 36/213 | 31/201 | 38/218 | 40/232 | 43/235 | 41/232 | 35/220 |
| Water Absorption of PCT 2HR (%): | 0.22 | 0.25 | 0.26 | 0.23 | 0.26 | 0.28 | 0.25 | 0.37 | 0.38 | 0.35 |
| Dielectric Constant (1 GHz) | 3.9 | 3.9 | 3.7 | 3.9 | 3.9 | 3.9 | 3.7 | 3.7 | 3.8 | 3.8 |
| Dielectric loss factor (1 GHz) | 0.005 | 0.005 | 0.005 | 0.005 | 0.005 | 0.005 | 0.004 | 0.004 | 0.004 | 0.004 |

It can be seen from the aforementioned table that in embodiments 1-8, the phosphorus-containing polyester composite of the instant disclosure can achieve a flame retardancy at UL94V-0. As compared, in the comparative embodiments 1-2, although additional flame retardants are added, only a flame retardancy as the UL94V-1 can be achieved. In terms of Tg, the phosphorus-containing polyester composite of the present invention can achieve a Tg over 170° C., while the comparative embodiments 1-2 can only achieve a Tg up to 160° C. At 1 GHz, a dielectric constant below 3.9 can be achieved in all of the embodiments, and at 1 GHz, a dielectric loss factor below 0.005 can be achieved in all of the embodiments. The heat resistance and flame retardancy of all of the embodiments comply with the IPC specifications. Therefore the composite of the present invention is applicable to the field of manufacture of high-ranking copper covered laminate material.

Although the invention has been disclosed with reference to the above embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A low-dielectric phosphorus-containing polyester composite, wherein the composite is prepared by condensation of (A) a poly-functional phosphorus-containing aromatic hydroxy compound, wherein the poly-functional phosphorus-containing aromatic hydroxy compound is composed of one or more compounds selected from the following compounds (A-1)-(A-2):

Compound (A-1)

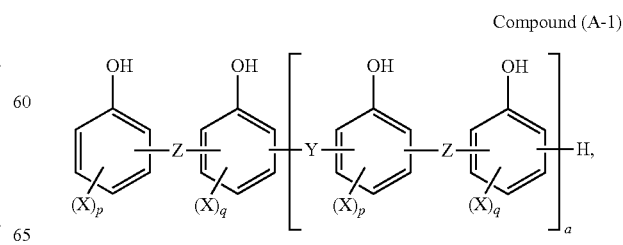

wherein

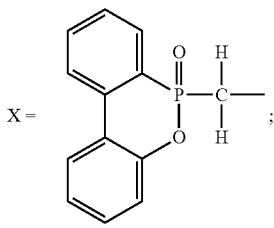 [SMILES: CCP1(=O)Oc2ccccc2-c2ccccc21]

Y=—CH₂— or —CH₂—O—CH₂—, wherein Y of different compounds is the same or different;
Z=an unsubstituted group,

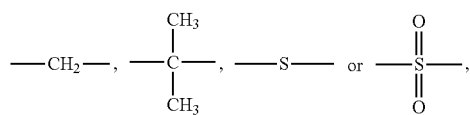

wherein Z of different compounds is the same or different;
p is an integer from 0 to 2; q is an integer from 0 to 2; p+q is an integer from 1 to 4; a is an integer greater than or equal to 0;

Compound (A-2)

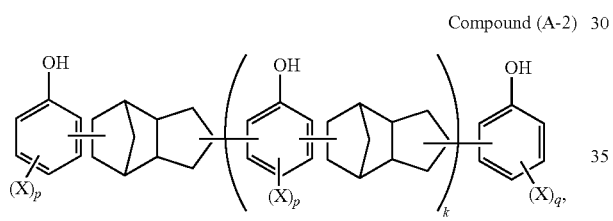

wherein X, p and q are defined as above;
k is an integer greater than or equal to 0;
(B) a difunctional aromatic acyl chloride compound;
and (C) a monofunctional aromatic phenol compound as a blocking agent.

2. The low-dielectric phosphorus-containing polyester composite of claim 1, wherein the poly-functional phosphorus-containing aromatic hydroxy compound (A-1) has the following structure:

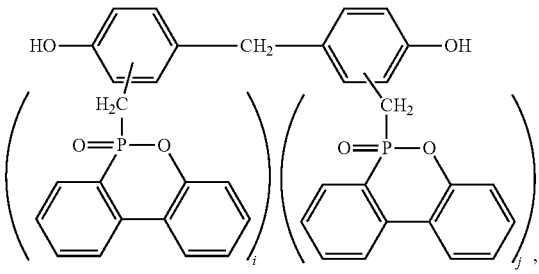

wherein i is an integer from 0 to 2; j is an integer from 0 to 2; and i+j is an integer from 1 to 4.

3. The low-dielectric phosphorus-containing polyester composite of claim 1, wherein the poly-functional phosphorus-containing aromatic hydroxy compound (A-1) has the following structure:

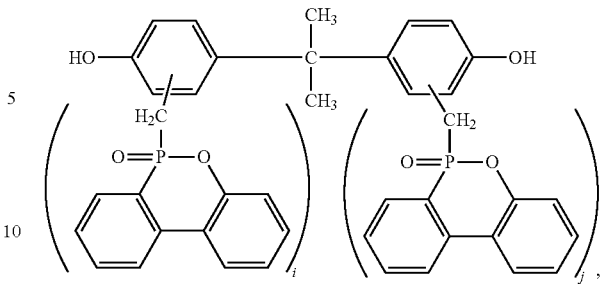

wherein i is an integer from 0 to 2; j is an integer from 0 to 2; and i+j is an integer from 1 to 4.

4. The low-dielectric phosphorus-containing polyester composite of claim 1, wherein the poly-functional phosphorus-containing aromatic hydroxy compound (A-1) has the following structure:

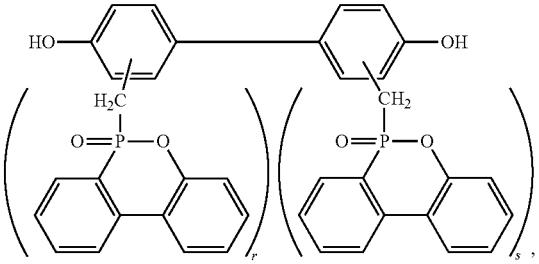

wherein r is an integer from 0 to 2; s is an integer from 0 to 2; and r+s is an integer from 1 to 4.

5. The low-dielectric phosphorus-containing polyester composite of claim 1, wherein the poly-functional phosphorus-containing aromatic hydroxy compound (A-1) has the following structure:

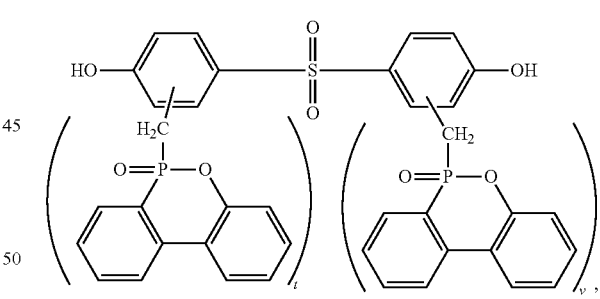

wherein t is an integer from 0 to 2; v is an integer from 0 to 2; and t+v is an integer from 1 to 4.

6. The low-dielectric phosphorus-containing polyester composite of claim 1, wherein the difunctional aromatic acyl chloride compound is selected from one or both of isophthaloyl dichloride and paraphthaloyl chloride.

7. The low-dielectric phosphorus-containing polyester composite of claim 1, wherein the monofunctional aromatic phenol compound as a blocking agent is selected from phenol; o-cresol, m-cresol, p-cresol, o-phenylphenol, m-phenylphenol, p-phenylphenol, 2,6-dimethylphenol, 2,4-dimethylphenol, α-naphthol and β-naphthol, or a combination thereof.

* * * * *